(12) United States Patent
Wu et al.

(10) Patent No.: US 6,366,456 B1
(45) Date of Patent: Apr. 2, 2002

(54) HOUSING WITH CARD-RETENTION CAPABILITY

(75) Inventors: Guo-Ming Wu; Chuan-Yuan Lee, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/726,333

(22) Filed: Dec. 1, 2000

(51) Int. Cl.⁷ .................................................. G06F 1/16
(52) U.S. Cl. ..................... 361/683; 361/679; 361/683; 361/686; 362/70; 362/800; 340/432; 273/157 R; 273/148 R; 273/179; 220/241; 179/179; 179/100 C; 174/66; 174/67; 40/5; 40/152; 40/152.1; 40/594; 40/611; 40/642; 40/649; 40/653
(58) Field of Search .............................. 40/642, 5, 152, 40/152.1, 594, 611, 649, 653; 174/66, 67; 220/241; 273/157 R, 309, 148 R; 179/179, 100 C; 362/72, 800; 340/432; 361/679, 683, 686

(56) References Cited

U.S. PATENT DOCUMENTS

| | | | | |
|---|---|---|---|---|
| 3,941,951 A | * | 3/1976 | Engstrom et al. | ........... 179/179 |
| 5,212,899 A | * | 5/1993 | Fandreyer | .................... 40/642 |
| 5,651,547 A | * | 7/1997 | Rannelli | .................. 273/157 R |
| 5,702,172 A | * | 12/1997 | Kilburn | ........................ 362/72 |

* cited by examiner

Primary Examiner—Leo P. Picard
Assistant Examiner—Yean-Hsi Chang
(74) Attorney, Agent, or Firm—Pillsbury Winthrop LLP

(57) ABSTRACT

A housing body with a card-retention capability includes a wall that has an outer surface and an inner surface. The outer surface is formed with an elongate card-receiving recess that has a recess bottom. The outer surface is further formed with a first cover-restricting flange that extends from a front end of the card-receiving recess and that cooperates with the recess bottom to form a cover-receiving slot, and a second cover-restricting flange that extends from a rear end of the card-receiving recess and that is formed with a tool hole communicated with the rear end of the card-receiving recess. The first and second cover-restricting flanges cooperatively form a card opening that is adapted to permit placing of a card on the recess bottom. The inner surface is formed with a cover-manipulating recess to communicate with the rear end of the card-receiving recess. An elongate flexible transparent cover is removably disposed in the card-receiving recess via the card opening such that a front cover portion of the cover extends into the cover-receiving slot, such that a rear cover portion of the cover is disposed between the tool hole and the cover-manipulating recess, and such that the cover is adapted to prevent removal of the card placed on the recess bottom via the card opening.

4 Claims, 5 Drawing Sheets

HOUSING WITH CARD-RETENTION CAPABILITY

BACKGROUND OF THE INVENTION

1. Field of the Invention

The invention relates to a housing, more particularly to a housing with a card-retention capability.

2. Description of the Related Art

Generally, a portable computer has a receptacle for holding a card, such as a name card. In U.S. Pat. No. 5,592,361, a tray is inserted into a receptacle located between a bottom surface and an applique affixed to the bottom surface for holding a card. However, the tray is a separate component produced by molding, thereby resulting in an increased high production cost. Furthermore, the applique and the tray are exposed from the bottom surface, thereby resulting in wearing thereof during use.

SUMMARY OF THE INVENTION

Therefore, the main object of the present invention is to provide a housing with a card retention capability that can be produced at a relatively low cost and that has a cover component which does not wear easily.

According to the present invention, a housing with a card-retention capability includes a housing body and an elongate flexible transparent cover.

The housing body includes a wall that has an outer surface and an inner surface opposite to the outer surface in a first direction. The outer surface is formed with an elongate card-receiving recess that extends in the first direction and that has front and rear ends opposite to each other in a second direction transverse to the first direction. The card-receiving recess further has a recess bottom. The outer surface is further formed with a first cover-restricting flange that extends in the second direction from the front end of the card-receiving recess and that cooperates with the recess bottom to form a cover-receiving slot, and a second cover-restricting flange that extends in the second direction from the rear end of the card-receiving recess and that is formed with a tool hole communicated with the rear end of the card-receiving recess. The first and second cover-restricting flanges cooperatively form a card opening that is adapted to permit placing of a card on the recess bottom. The inner surface is formed with a cover-manipulating recess that extends in the first direction to communicate with the rear end of the card-receiving recess.

The cover has a front cover portion and a rear cover portion opposite to the front cover portion in the second direction. The cover is removably disposed in the card-receiving recess via the card opening such that the front cover portion extends into the cover-receiving slot, such that the rear cover portion is disposed between the tool hole and the cover-manipulating recess, and such that the cover is adapted to prevent removal of the card placed on the recess bottom via the card opening.

As such, when a tool is inserted into the tool hole to force the rear cover portion into the cover-manipulating recess, the cover will flex to remove the front cover portion from the cover-receiving slot, thereby permitting removal of the card placed on the recess bottom via the card opening.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
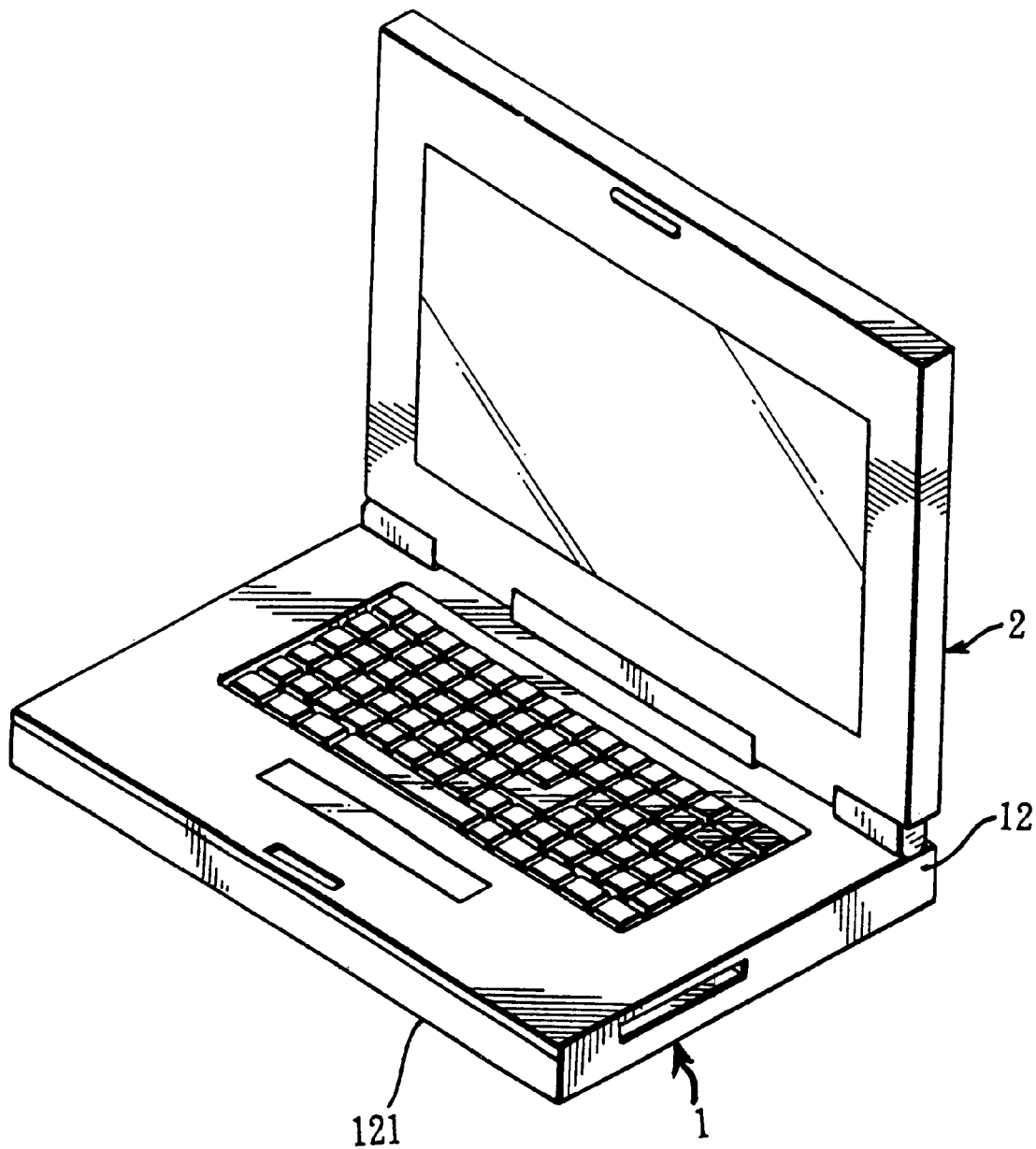
FIG. 1 is a perspective view of a portable computer.
Figure 2:
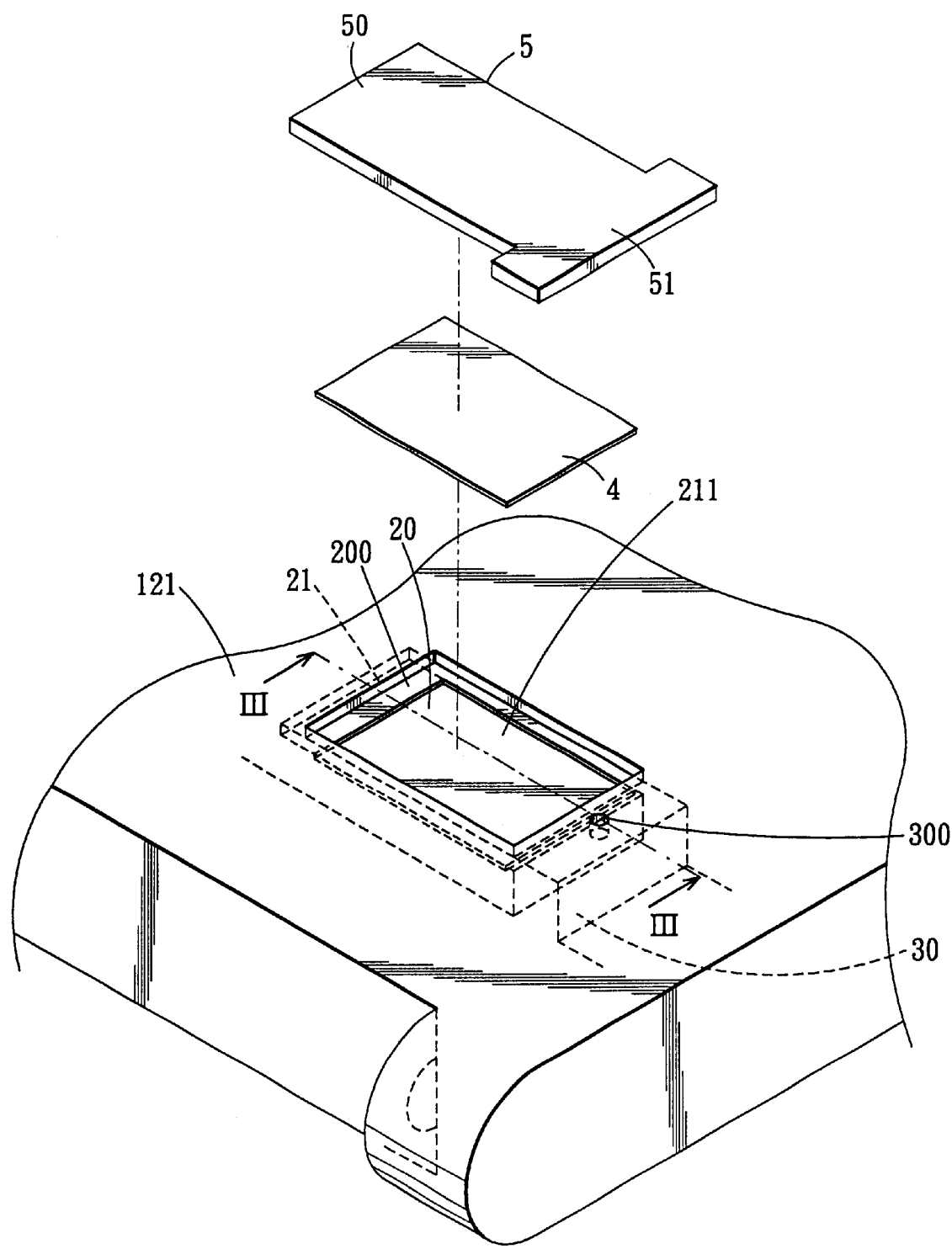
FIG. 2 is a fragmentary exploded perspective view of the preferred embodiment of a computer housing of the portable computer according to this invention.
Figure 3:
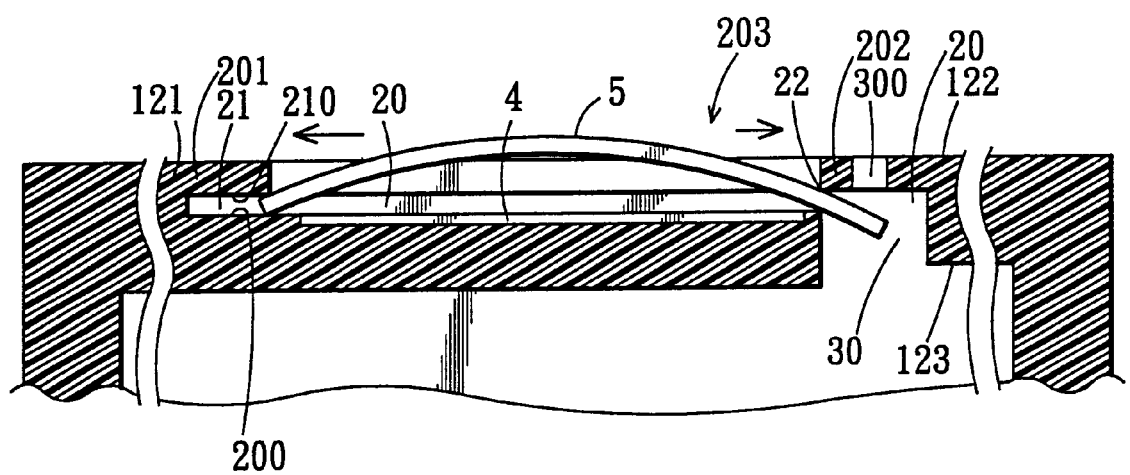
FIGS. 3 and 4 are fragmentary schematic sectional views of the preferred embodiment taken along line III—III in FIG. 2 showing how a card is retained in the computer housing.
Figure 4:
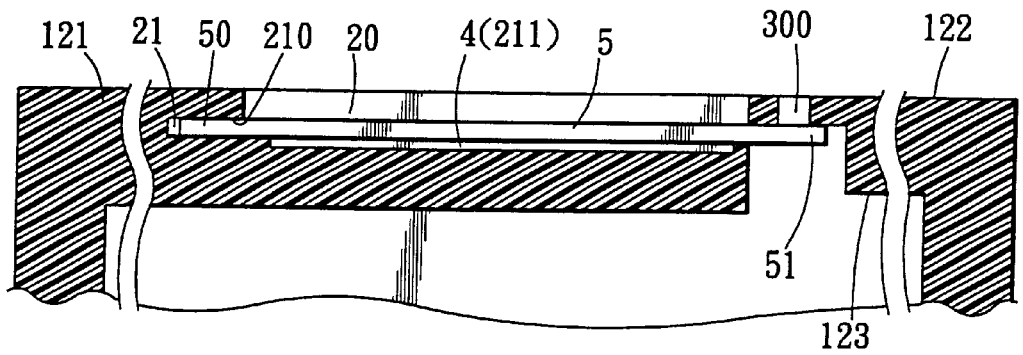

Referring to FIGS. 1 to 4, the present invention is shown to be embodied in a electronic device, such as a portable computer, that has a main computer housing 1, and a display panel 2. The computer housing 1 includes a housing body 12, and an elongate flexible transparent cover 5.

The housing body 12 includes a bottom wall 121 that has an outer surface 122 and an inner surface 123 opposite to the outer surface 122 in a first direction. The outer surface 122 is formed with an elongate card-receiving recess 20 that extends in the first direction and that has front and rear ends opposite to each other in a second direction transverse to the first direction. The card-receiving recess 20 further has a recess bottom 200. The outer surface 20 is further formed with a first cover-restricting flange 201 that extends in the second direction from the front end of the card receiving recess 20 and that cooperates with the recess bottom 200 to form a cover-receiving slot 21, and a second cover-restricting flange 202 that extends in the second direction from the rear end of the card receiving recess 20 and that is formed with a tool hole 300 communicated with the rear end of the card-receiving recess 20. The first and second cover-restricting flanges 201, 202 cooperatively form a card opening 203 that is adapted to permit placing of a card 4 on the recess bottom 200. The recess bottom 200 is formed with a card-receiving groove 211 adapted for seating of the card 4 therein. The inner surface 123 is formed with a cover-manipulating recess 30 that extends in the first direction to communicate with the rear end of the card-receiving recess 20.

The cover 5 has a front cover portion 50 and a rear cover portion 51 opposite to the front cover portion 50 in the second direction. The cover 5 is removably disposed in the card-receiving recess 20 via the card opening 203 such that the front cover portion 50 extends into the cover-receiving slot 21, such that the rear cover portion 51 is disposed between the tool hole 300 and the cover-manipulating recess 30, and such that the cover 5 is adapted to prevent removal of the card 4 placed on the recess bottom 200 via the card opening 203.

Figure 5:
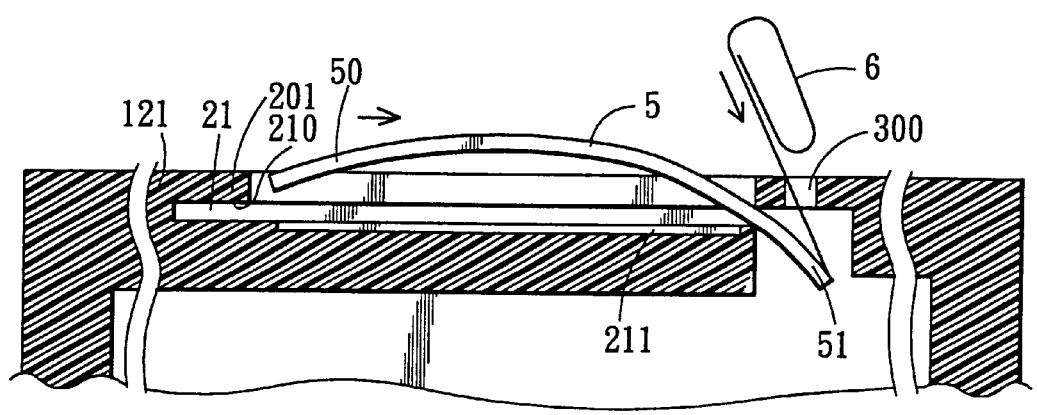
FIG. 5 is a fragmentary schematic sectional view of the preferred embodiment showing how a flexible cover is removed from the computer housing.
Figure 6:
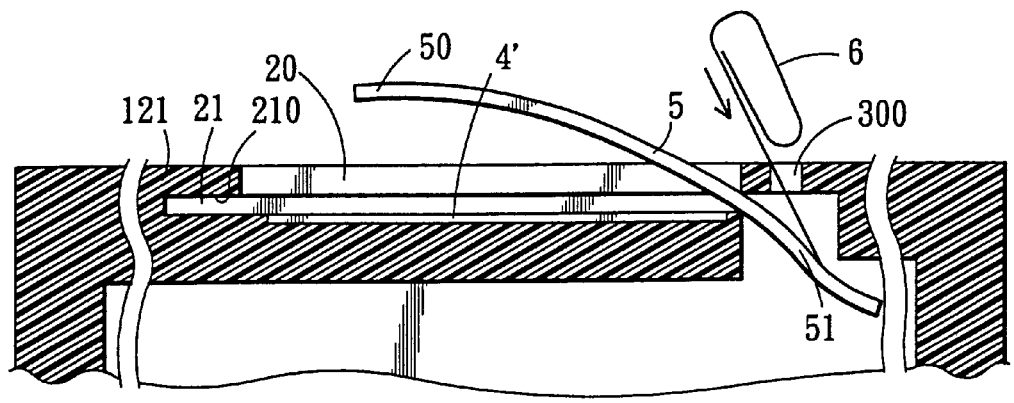
FIGS. 6 and 7 are fragmentary schematic sectional views of the preferred embodiment showing how replacement of a card is conducted.
Figure 7:
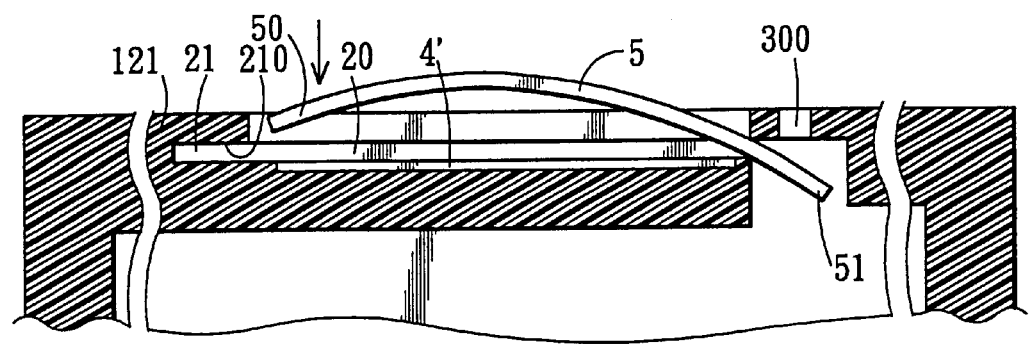

Referring to FIGS. 5 to 7, when it is desired to replace the card 4, a tool, such as one end of a paper clip 6, can be inserted into the tool hole 300 to force the rear cover portion 51 into the cover-manipulating recess 30. The cover 5 will flex to remove the front cover portion 50 from the cover-receiving slot 21, thereby permitting removal of the card 4 placed on the recess bottom 200 via the card opening 203, and the subsequent placing of another card 4' on the recess bottom 200 via the card opening 203.

It is noted that the cover 5 is formed as a transparent plastic plate, which can be fabricated at a relatively low cost as compared with the tray used in the aforesaid prior art. Furthermore, due to the design of the card-receiving recess 20, wearing of the cover 5 can be minimized, thereby resulting in a relatively long service life. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A housing with a card-retention capability, comprising:

a housing body including a wall that has an outer surface and an inner surface opposite to said outer surface in a first direction, said outer surface being formed with an elongate card-receiving recess that extends in the first direction and that has front and rear ends opposite to each other in a second direction transverse to the first direction, said card-receiving recess further having a recess bottom, said outer surface being further formed with a first cover-restricting flange that extends in the second direction from said front end of said card-receiving recess and that cooperates with said recess bottom to form a cover-receiving slot, and a second cover-restricting flange that extends in the second direction from said rear end of said card-receiving recess and that is formed with a tool hole communicated with said rear end of said card-receiving recess, said first and second cover-restricting flanges cooperatively forming a card opening that is adapted to permit placing of a card on said recess bottom, said inner surface being formed with a cover-manipulating recess that extends in the first direction to communicate with said rear end of said card-receiving recess; and an elongate flexible transparent cover having a front cover portion and a rear cover portion opposite to said front cover portion in the second direction, said cover being removably disposed in said card-receiving recess via said card opening such that said front cover portion extends into said cover-receiving slot, such that said rear cover portion is disposed between said tool hole and said cover-manipulating recess, and such that said cover is adapted to prevent removal of the card placed on said recess bottom via said card opening;

whereby, when a tool is inserted into said tool hole to force said rear cover portion into said cover-manipulating recess, said cover will flex to remove said front cover portion from said cover-receiving slot, thereby permitting removal of the card placed on said recess bottom via said card opening.

2. The housing of claim 1, wherein said housing body forms a part of an electronic device.

3. The housing of claim 1, wherein said wall is a bottom wall of said housing body.

4. The housing of claim 1, wherein said recess bottom is formed with a card-receiving groove adapted for seating of the card therein.

* * * * *